(12) United States Patent
Wang et al.

(10) Patent No.: US 10,961,342 B2
(45) Date of Patent: *Mar. 30, 2021

(54) RESIN FORMULATION AND USES THEREOF

(71) Applicant: AGENCY FOR SCIENCE, TECHNOLOGY AND RESEARCH, Singapore (SG)

(72) Inventors: FuKe Wang, Singapore (SG); Fei Wang, Singapore (SG); Chaobin He, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 55 days.

This patent is subject to a terminal disclaimer.

(21) Appl. No.: 16/344,840

(22) PCT Filed: Oct. 25, 2017

(86) PCT No.: PCT/SG2017/050537
§ 371 (c)(1),
(2) Date: Apr. 25, 2019

(87) PCT Pub. No.: WO2018/080397
PCT Pub. Date: May 3, 2018

(65) Prior Publication Data
US 2020/0087443 A1 Mar. 19, 2020

(30) Foreign Application Priority Data
Oct. 25, 2016 (SG) .......................... 10201609018Y

(51) Int. Cl.
| | | |
|---|---|---|
| C08F 2/46 | (2006.01) | |
| C08F 2/50 | (2006.01) | |
| C08G 61/04 | (2006.01) | |
| C08G 59/22 | (2006.01) | |
| C08F 20/18 | (2006.01) | |
| C08F 32/06 | (2006.01) | |
| C08F 222/10 | (2006.01) | |
| C08G 59/32 | (2006.01) | |
| C08K 5/00 | (2006.01) | |
| C08K 5/23 | (2006.01) | |
| C08K 5/53 | (2006.01) | |
| C08L 63/00 | (2006.01) | |
| C09K 11/06 | (2006.01) | |
| C09K 11/08 | (2006.01) | |
| B33Y 70/00 | (2020.01) | |
| B33Y 80/00 | (2015.01) | |

(52) U.S. Cl.
CPC ............ *C08G 59/223* (2013.01); *C08F 20/18* (2013.01); *C08F 32/06* (2013.01); *C08F 222/1006* (2013.01); *C08G 59/226* (2013.01); *C08G 59/32* (2013.01); *C08K 5/0025* (2013.01); *C08K 5/23* (2013.01); *C08K 5/53* (2013.01); *C08L 63/00* (2013.01); *C09K 11/06* (2013.01); *C09K 11/08* (2013.01); *B33Y 70/00* (2014.12); *B33Y 80/00* (2014.12); *C08F 222/102* (2020.02); *C08L 2310/00* (2013.01); *C08L 2312/06* (2013.01)

(58) Field of Classification Search
CPC .......... C08L 63/00; C08L 33/08; C08L 33/04; C08L 2310/00; C08L 2312/06; C09K 11/06; C09K 11/08; C08K 5/23; B33Y 70/00; B33Y 80/00; C08G 59/00; C08G 59/223; C08G 59/688; C08G 59/226; C08G 59/32; C08F 222/1006; C08F 222/102; C08F 20/18; C08F 32/06
USPC .......................... 522/110, 109, 1, 111; 520/1
See application file for complete search history.

(56) References Cited

U.S. PATENT DOCUMENTS

2016/0060449 A1 3/2016 Shulga et al.

FOREIGN PATENT DOCUMENTS

| CN | 103755889 | * | 4/2014 |
|---|---|---|---|
| CN | 103755889 A | | 4/2014 |
| CN | 105566915 A | | 5/2016 |
| CN | 105785714 A | | 7/2016 |
| CN | 105911820 | * | 8/2016 |
| CN | 106700377 A | | 5/2017 |

(Continued)

OTHER PUBLICATIONS

Heng, CN103755889 Machine Translation, Apr. 30, 2014 (Year: 2014).*

(Continued)

*Primary Examiner* — Jessica Whiteley
(74) *Attorney, Agent, or Firm* — Marshall, Gerstein & Borun LLP

(57) ABSTRACT

There is provided a resin formulation comprising a resin precursor, a crosslinking additive, a photoinitiator, and at least one luminescent dye, wherein the crosslinking additive comprises a functional group selected from the group consisting of hydroxyl, alkoxyl, carboxylic acid, amine, amide, alkylacrylate, acrylate, epoxy, alkyl and heterocycloalkyl. The crosslinking additive of the resin formulation may help to homogeneously disperse the luminescent dye in the resin formulation and decrease the viscosity by improving the miscibility and polarity between the resin precursor and the luminescent dye, leading to an increase of solidification rate of the resin formulation during 3D printing such as stereolithography and digital light processing (DLP). There is also provided a method of preparing the resin formulation and uses of the resin formulation thereof.

22 Claims, 6 Drawing Sheets

(56) References Cited

FOREIGN PATENT DOCUMENTS

JP          2016-138176 A      8/2016
WO     WO-2011116050 A2 *   9/2011    ............ C09J 163/00

OTHER PUBLICATIONS

Wang et al, CN 105911820 Machine Translation, Aug. 31, 2016 (Year: 2016).*
Heng, CN 103755889 Claim Machine Translation, Apr. 30, 2014 (Year: 2014).*
Search Report and Written Opinion in International Application No. PCT/SG2017/050537 dated Dec. 28, 2017, 32 pages.
Wang et al., "Photopolymer Resins for Luminescent Three-dimensional Printing", Journal of Applied Polymer Science, vol. 134, May 2, 2017, 8 pages.

* cited by examiner

[Fig. 1]
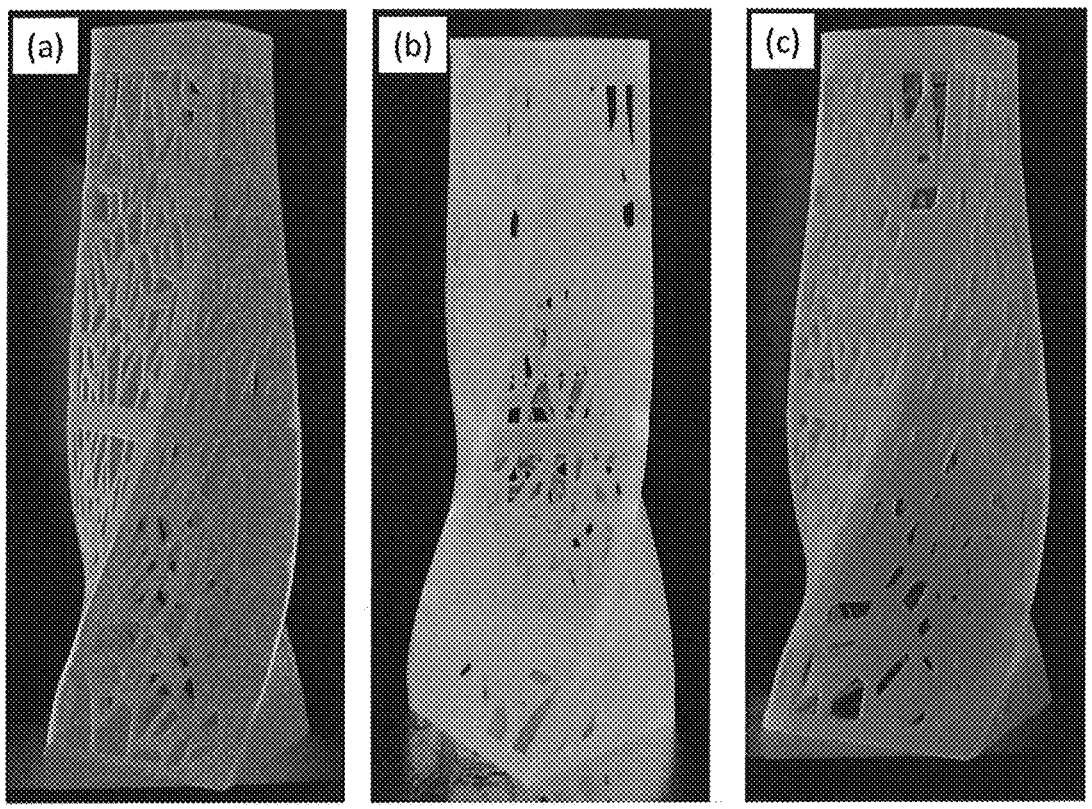
[Fig. 2]
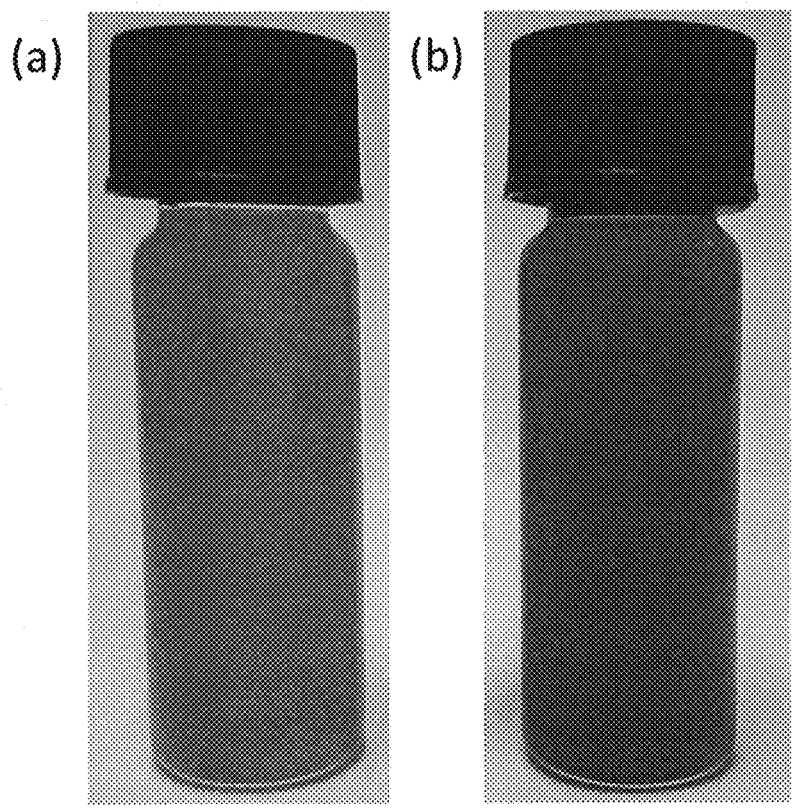

[Fig. 3]
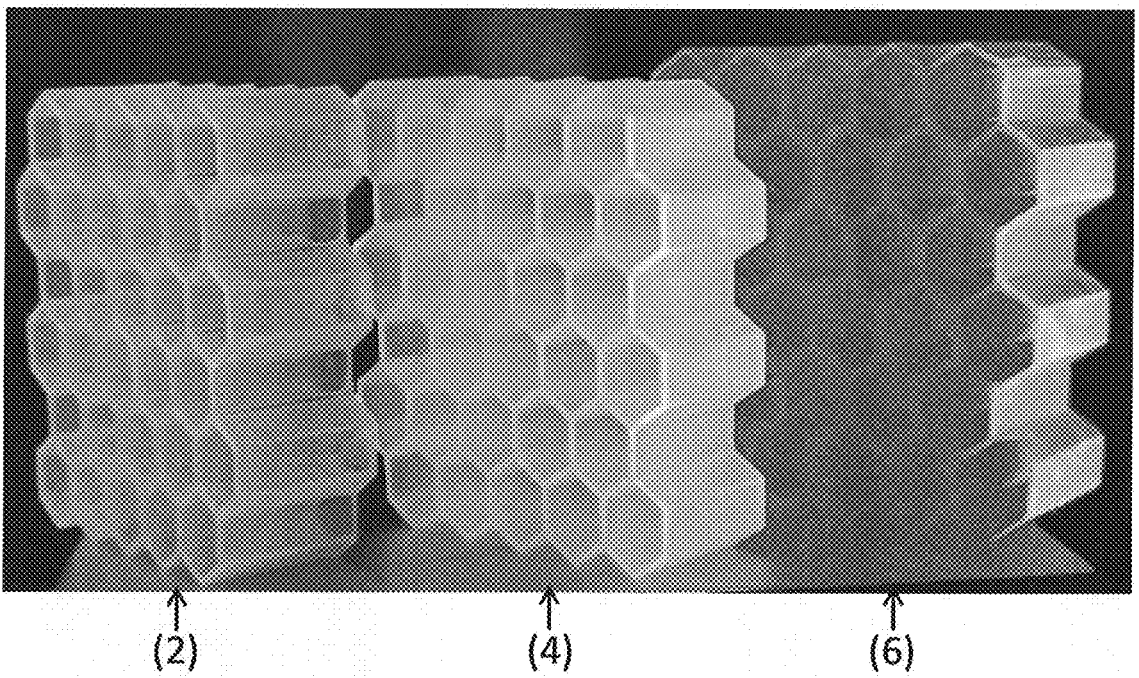
(2)　　　　　(4)　　　　　(6)
[Fig. 4]
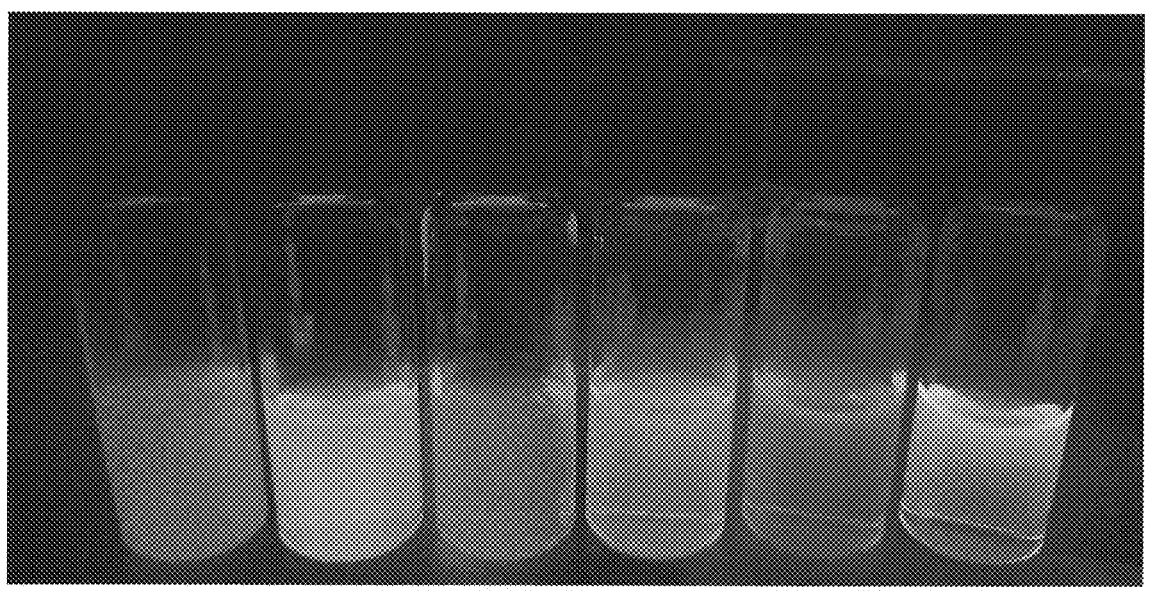
(a)　(b)　(c)　(d)　(e)　(f)

[Fig. 5]
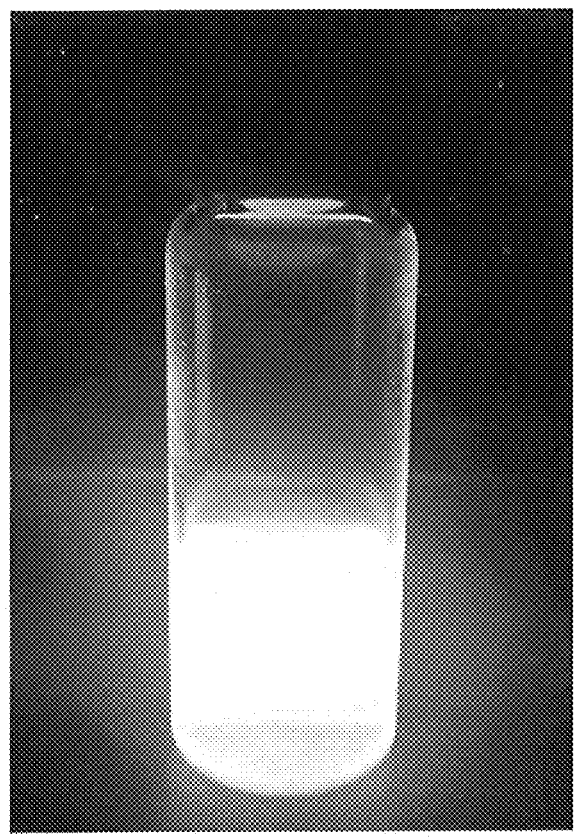

[Fig. 6]
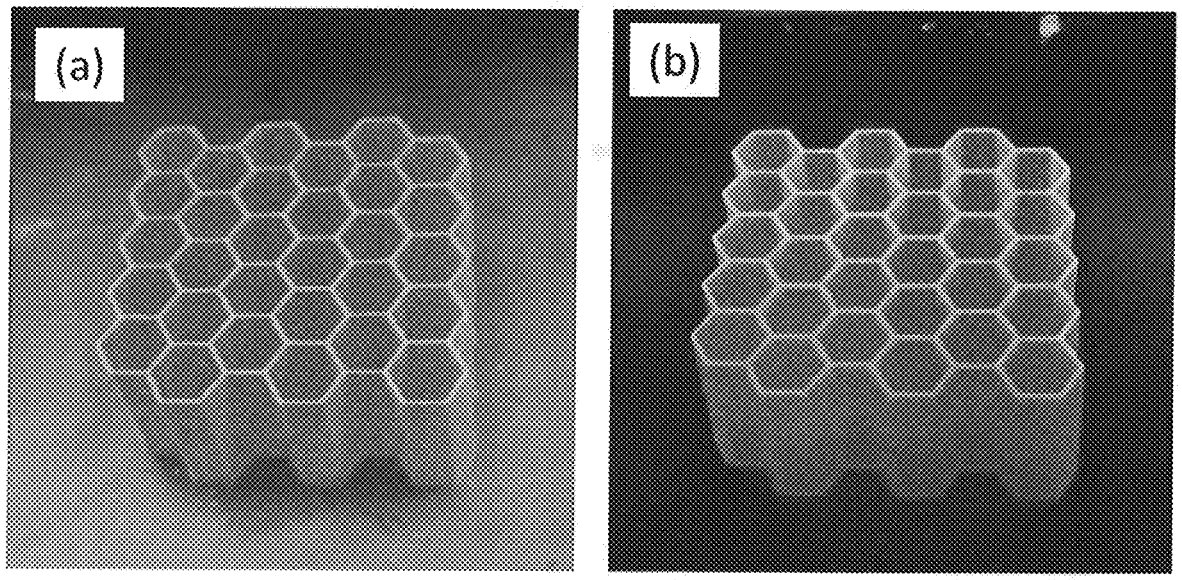
[Fig. 7]
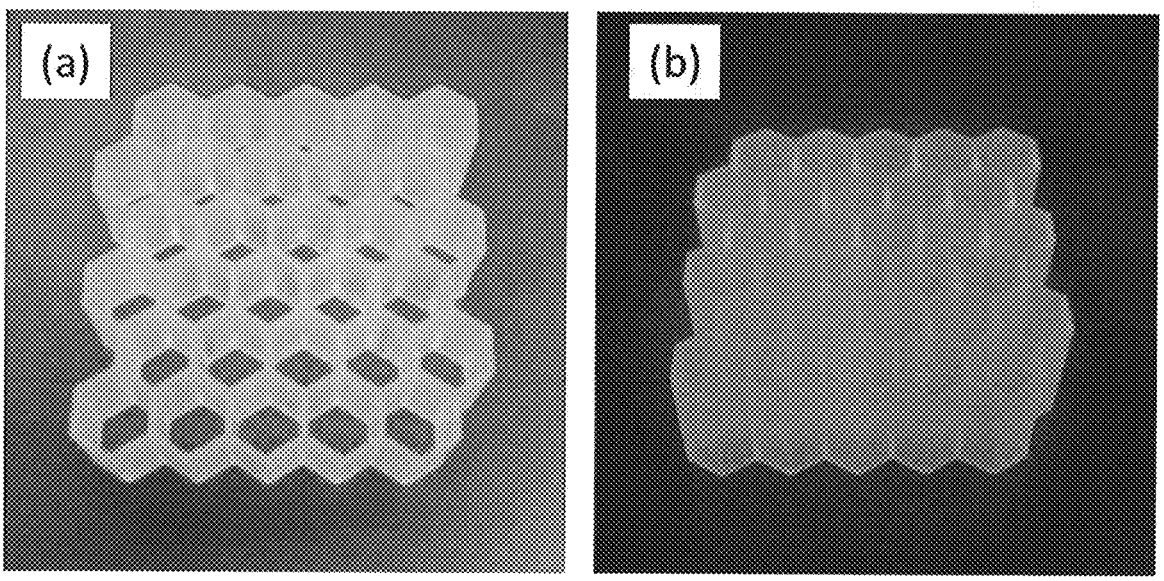

[Fig. 8]
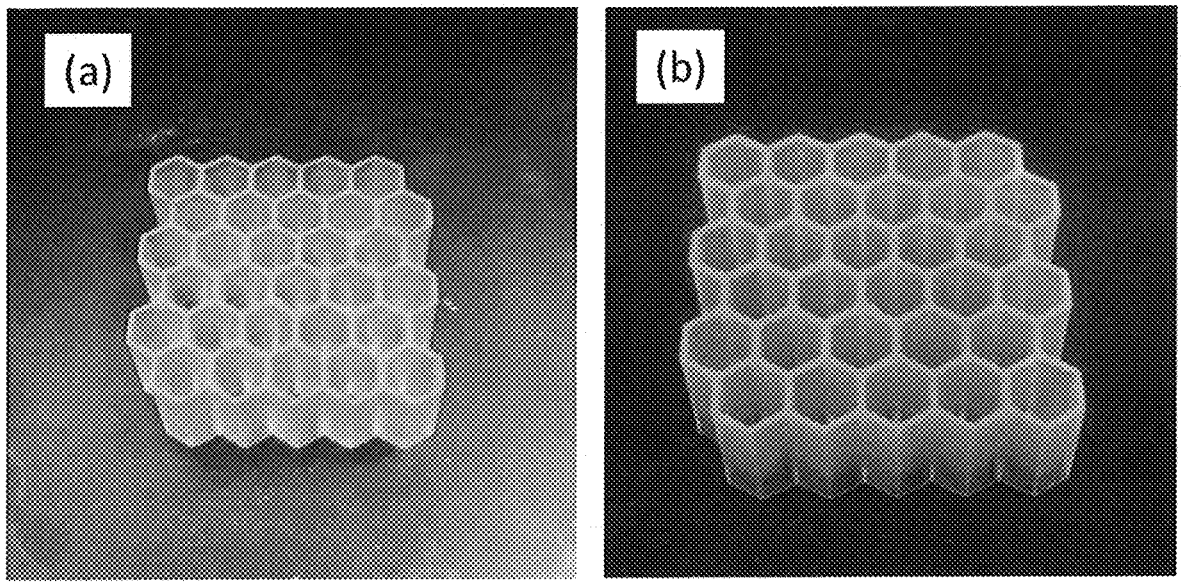
[Fig. 9]
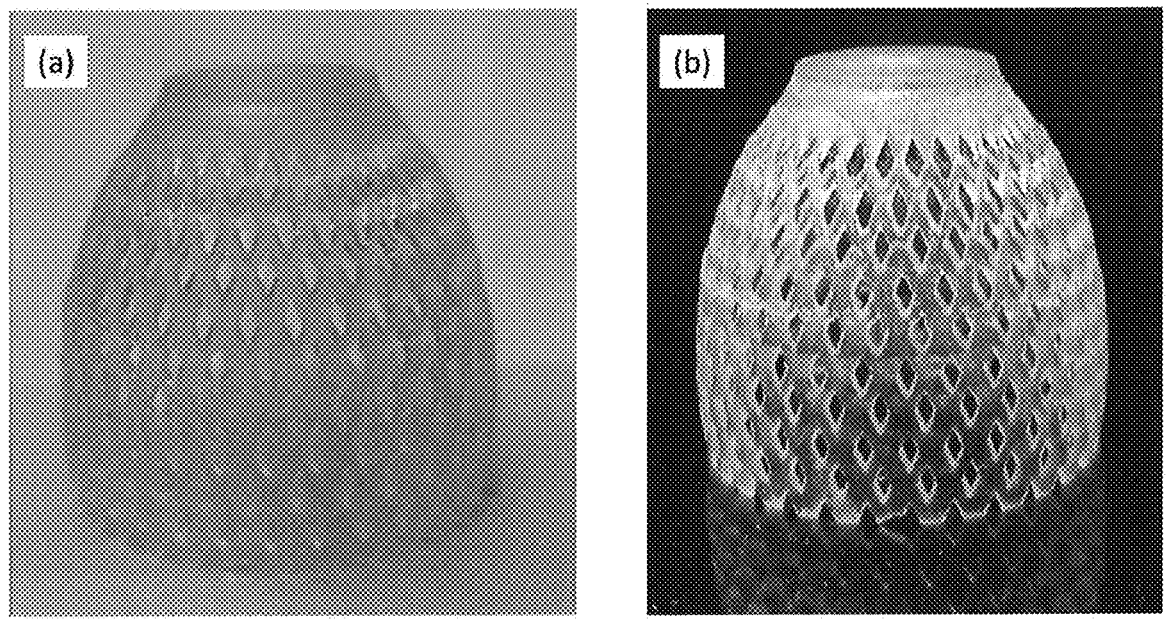

[Fig. 10]
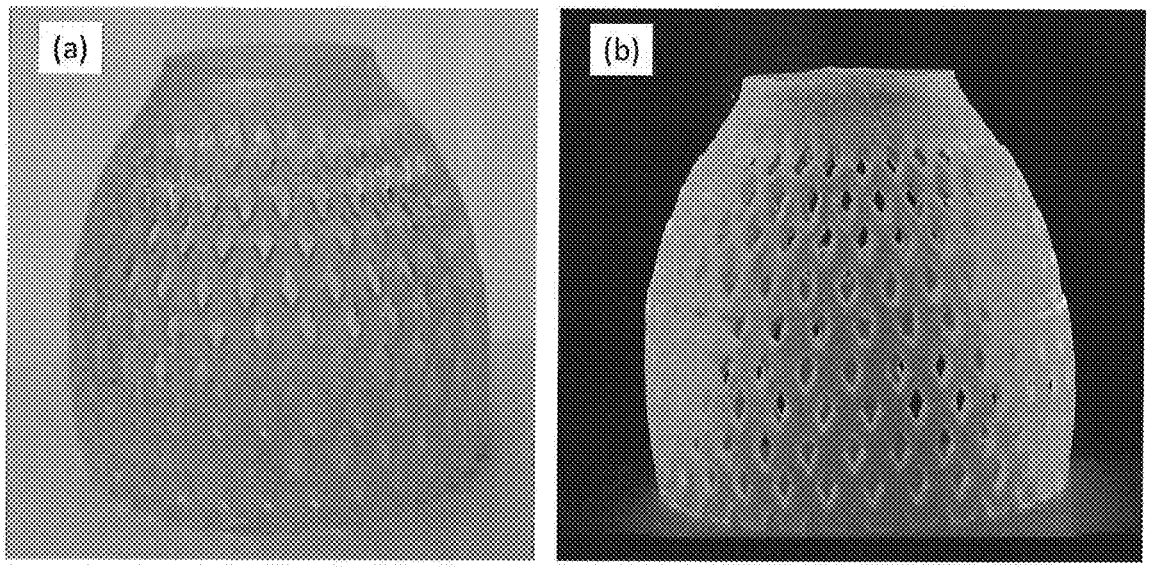
[Fig. 11]
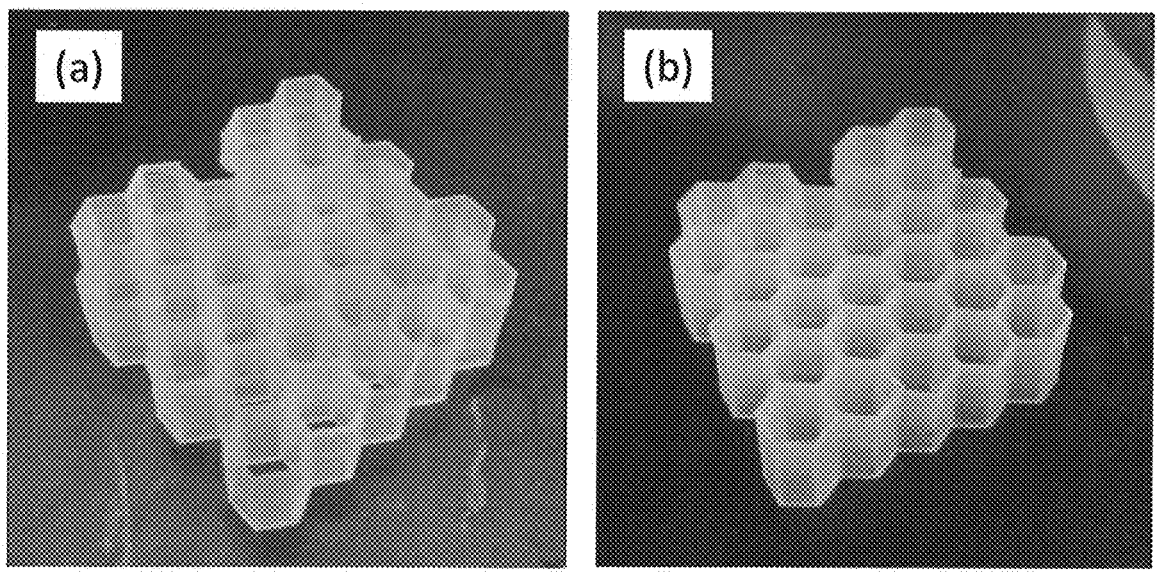

RESIN FORMULATION AND USES THEREOF

TECHNICAL FIELD

The present invention generally relates to a resin formulation and the uses thereof. The present invention also relates to a method of preparing a resin formulation.

BACKGROUND ART

Three-dimensional (3D) printing, also known as additive manufacturing, refers to the technology used for the rapid production of 3D objects directly from digital designs. During the 3D printing process, successive layers of materials are formed with software-controlled shape and thickness, which creates a 3-dimensional object. With the unique ability to create complicated 3D objects in a fast yet accurate manner, 3D printing technology is now widely used in mold fabrication, industry design, jewelry industry, architecture, and dental applications.

Among different 3D printing processes, Stereolithography (SLA) and Digital Light Processing (DLP) 3D printing techniques feature the use of a liquid photopolymer which is solidified during the printing process to form a solid 3D printed object. Due to the low cost and simple operation, numerous personal SLA/DLP printers are available in the market. Compared with fast growing 3D printing market, however, the availability of compatible liquid resins are limited. Despite recent efforts to develop new compatible materials for SLA/DLP printing such as transparent materials (PlasCLEAR by Asiga), direct casting materials (Super WAX by Asiga), and elastic resins for flexible prints (SPOT-E by Spot-A Materials) and etc., there exists only a few functional resins that are commercially available.

Luminescence materials such as organic and inorganic dyes have been widely used in lighting, decoration, biochemistry, analytical chemistry, and medicine. The ability to create complex 3D luminescent structures would not only expand the application of luminescence materials but also broaden the applications of current 3D printing technologies. Furthermore, there is a high demand to develop luminescent resin that can be used for 3D printing technology such as SLA and DLP, which would be important for exploring new applications of 3D printing techniques and for developing new printing products for home and industry applications. However, due to the low miscibility of luminescent dyes (both organic and inorganic) with a suitable 3D liquid resin, together with heavy light absorption of luminescent dyes in the photo-polymerization process, there are currently no commercially available luminescent resins.

One of the major problems faced in incorporating luminescent dyes into liquid 3D resins was the immiscibility of luminescent dyes in liquid resins. Moreover, luminescent dyes not only absorbed light during 3D printing, but also emitted strong luminescent light after excitation with the light source in the printing process. The luminescent light emitted from dyes interfered with the polymerization of the liquid resin and decreased printing accuracy. Therefore, it is a challenge to develop printable luminescent resins for the liquid based 3D printing techniques.

There is a need to provide a resin formulation that overcomes, or at least ameliorates, one or more of the disadvantages described above. There is also a need to provide a 3D print that overcomes, or at least ameliorates, one or more of the disadvantages described above.

SUMMARY OF INVENTION

According to one aspect, there is provided a resin formulation comprising a) a resin precursor, b) a crosslinking additive, c) a photoinitiator, and d) at least one luminescent dye, wherein the crosslinking additive of b) comprises a functional group selected from the group consisting of hydroxyl, alkoxyl, carboxylic acid, amine, amide, alkylacrylate, acrylate, epoxy, alkyl and heterocycloalkyl.

Advantageously, the crosslinking additive of the resin formulation may help to homogeneously disperse the luminescent dye in the resin by improving the miscibility and polarity between the resin precursor and the luminescent dye. For example, the solubilizing acrylate monomer may be selected based on "like dissolves like" principle, wherein if the luminescent dye is structurally polar, the solubilizing acrylate monomer having polar functional groups like hydroxyl and carboxylic acid may be selected for the particular reaction and vice versa where the nonpolar luminescent dye will require a nonpolar solubilizing acrylate monomer. More advantageously, the presence of the crosslinking additive may decrease the viscosity, thereby increasing the solidification rate of the resin formulation during 3D printing.

Advantageously, the presence of a photoabsorber or photostabilizer may help to control the curing depth of the resin formulation during 3D printing, and may produce more accurate 3D prints.

Further, electromagnetic radiation emitted from luminescent dyes may initiate a reaction between the photoinitiator and the resin formulation, which may interfere with the light initiation polymerization process during the printing process. More advantageously, the presence of a photoabsorber may enhance the printing accuracy of the printed object or article by absorbing the interfering light emitted from the luminescent dye.

According to another aspect, there is provided a method of preparing a resin formulation as described herein, comprising the step of stirring a resin precursor, a crosslinking additive, a photoinitiator, and at least one luminescent dye in the absence of light for a period of time to form a reaction mixture; and optionally ultrasonicating the reaction mixture.

According to yet another aspect, there is provided a method of printing a luminescent object comprising exposing the resin formulation as described herein to a light source.

According to a further aspect, there is provided a use of the resin formulation as described herein as a material for three-dimensional printing.

According to another aspect, there is provided a three-dimensional printed article comprising the resin formulation as described herein, wherein said resin formulation is in a cured state.

According to another aspect, there is provided a method of tuning a colour of a three-dimensional printed article comprising the step of mixing a resin precursor, a crosslinking additive, a photoinitiator, and two or more luminescent dyes in the absence of light.

Advantageously, addition of two or more luminescent dye may enable the colour of the three-dimensional printed article to be modified i.e. when blue and green luminescent dyes are combined, indigo luminescent colour may be achieved, when blue and red luminescent dyes are combined, violet luminescent colour may be achieved, when green and red luminescent dyes are combined, yellow luminescent colour may be achieved and when blue and red luminescent dyes are combined, white luminescent colour may be achieved.

Definitions

The following words and terms used herein shall have the meaning indicated:

The term "resin formulation" is to be interpreted broadly to include a material or a mixture prepared according to a formula comprising a synthetic organic polymer. The resin formulation may be used as a material for 3D printing where the resin formulation forms a printed object when exposed to a curing agent.

The term "luminescence" or "fluorescence" as used herein refers to the emission of light by a substrate or a substance that has not been heated, as in fluorescence and phosphorescence.

The term "photoabsorber" or "photostabilizer" as used herein refers to a substrate or a substance to control the curing depth during the 3D printing process.

The term "photoinitiator" as used herein refers to a compound that undergoes a photoreaction on absorption of light, producing reactive species. Such compounds are capable of initiating or catalyzing chemical reactions that may result in significant changes in the solubility and physical properties of suitable formulations.

The following are some definitions that may be helpful in understanding the description of the present invention. These are intended as general definitions and should in no way limit the scope of the present invention to those terms alone, but are put forth for a better understanding of the following description.

Unless the context requires otherwise or specifically stated to the contrary, integers, steps, or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of elements or integers. Thus, in the context of this specification, the term "comprising" means "including principally, but not necessarily solely".

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations or any two or more of said steps or features.

As used herein, the term "alkyl group" includes within its meaning monovalent ("alkyl") and divalent ("alkylene") straight chain or branched chain saturated aliphatic groups having from 1 to 10 carbon atoms, e.g., 1, 2, 3, 4, 5, 6, 7, 8, 9, or 10 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "heterocyclic" or "heterocyclyl" refers to a saturated, partially unsaturated or fully unsaturated monocyclic, bicyclic or polycyclic ring system containing at least one heteroatom selected from the group consisting of nitrogen, sulfur and oxygen as a ring atom. Examples of heterocyclic moieties include heterocycloalkyl, heterocycloalkenyl and heteroaryl.

The term "heterocycloalkyl" refers to a saturated monocyclic, fused or bridged or spiro polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Exemplary heterocycloalkyl substituents include pyrrolidinyl, piperidinyl, azepanyl, piperazinyl, dioxanyl, morpholinyl, pyrazolinidyl, morpholinyl, thiomorpholinyl, tetrahydropyridinyl, tetrahydropyrazolopyridine, oxotetrahydroquinolinyl, azabicyloheptanyl, azabicyclooctanyl, azaspirocyclooctanyl or dioxaazaspirodecanyl. A heterocycloalkyl group typically is a $C_2$-$C_{12}$ heterocycloalkyl group. A heterocycloalkyl group may comprise 3 to 9 ring atoms. A heterocycloalkyl group may comprise 1 to 3 heteroatoms independently selected from the group consisting of N, O and S. The group may be a terminal group or a bridging group.

The term "acrylate" refers to a salt, ester, and conjugate base of acrylic acid and its derivatives. Acrylate contains vinyl groups, that is, two carbon atoms double bonded to each other, directly attached to the carbonyl carbon. Exemplary acrylates include, but are not limited to, methyl acrylate, acrylic acid and methacrylate. The group may be a terminal group.

The term "alkyl acrylate" refers to a combination of the definitions of alkyl and acrylate as defined herein, such as alkyl-acrylate or acrylate-alkyl. The group may be a terminal group or a bridging group.

The term "aryl" refers to as a group or part of a group denotes (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a C5-7 cycloalkyl or C5-7 cycloalkenyl group are fused together to form a cyclic structure, such as tetrahydronaphthyl, indenyl or indanyl. The group may be a terminal group or a bridging group. Typically an aryl group is a C6-C18 aryl group. Exemplary aryls include, but are not limited to, phenyl, naphthyl, indenyl, indanyl, azulenyl, fluorenyl, anthracenyl, furyl, thienyl, pyridyl, pyrrolyl, oxazolyly, thiazolyl, imidazolyl, pyrazolyl, 2-pyrazolinyl, pyrazolidinyl, isoxazolyl, isothiazolyl, 1,2,3-oxadiazolyl, 1,2,3-triazolyl, 1,3,4-thiadiazolyl, pyridazinyl, pyrimidinyl, pyrazinyl, 1,3,5-triazinyl, 1,3,5-trithianyl, indolizinyl, indolyl, isoindolyl, 3H-indolyl, indolinyl, benzo[b]furanyl, 2,3-dihydrobenzofuranyl, benzo[b]thiophenyl, 1H-indazolyl, benzimidazolyl, benzthiazolyl, purinyl, 4H-quinolizinyl, quinolinyl, isoquinolinyl, cinnolinyl, phthalazinyl, quinazolinyl, quinoxalinyl, 1,8-naphthyridinyl, pteridinyl, carbazolyl, acridinyl, phenazinyl, phenothiazinyl, and phenoxazinyl.

The term "arylalkyl" means an aryl-alkyl- group in which the aryl and alkyl moieties are as defined herein. Exemplary arylalkyl groups include benzyl, phenethyl, 1-naphthalenemethyl and 2-naphthalenemethyl. The group may be a terminal group or a bridging group. If the group is a terminal group it is bonded to the remainder of the molecule through the alkyl group.

The term "alkoxyl" as used herein refers to straight chain or branched alkyl-oxy groups. Examples include ethoxy, n-propoxy, isopropoxy, tert-butoxy, and the like.

The term "arylalkoxyl" means an aryl-alkyl-O— group in which the alkyl and aryl are as defined herein. The group may be a terminal group or a bridging group. If the group is a terminal group it is bonded to the remainder of the molecule through the oxygen atom.

The term "alkylamine" or "alkylamino" includes both mono-alkylamino and dialkylamino, unless specified. "Mono-alkylamino" means a Alkyl-NH— group, in which alkyl is as defined herein. "Dialkylamino" means a (alkyl)$_2$N— group, in which each alkyl may be the same or different and are each as defined herein for alkyl. The group may be a terminal group or a bridging group. If the group is a terminal group it is bonded to the remainder of the molecule through the nitrogen atom.

The term "arylalkylamine" as used herein refers to an amine containing a saturated or unsaturated hydrocarbon chain. A primary arylalkylamine is composed of a ring of 6 to 10 carbon atoms. Exemplary arylalkylamines include but are not limited to phenyl, tolyl, alkoxyphenyl, alkoxycarbonylphenyl, and halophenyl. The term "aryl" as used herein, is phenyl, 1-naphthyl, and 2-naphthyl. The term "substituted aryl" as used herein, is phenyl, 1-naphthyl and 2-naphthyl having a substituent selected from the group consisting of phenyl, heteroaryl, lower alkyl, lower alkoxy, lower alkylthio, halo, hydroxy, trifluoromethyl, amino, —NH(lower alkyl), and —N(lower alkyl)2, as well as being mono-, di- and tri-substituted phenyl, 1-naphthyl, and 2-naphthyl containing substituents selected from methyl, methoxy, methylthio, halo, hydroxy, and amino.

The term "alkylsilane" as used herein refers to an alkylsilane group with at least one silicon carbon bond (e.g., Si—CH$_3$) in which the alkyl is as defined herein.

The term "arylalkylsilane" as used herein refers to an aryl-alkylsilane group in which the aryl and alkylsilane moieties are as defined herein.

The term "alkylcarboxylic acid" refers to a branched or linear alkyl group wherein at least one terminus is substituted with a —COOH group.

The term "arylalkylcarboxylic acid" as used herein refers to an aryl-alkylcarboxylic acid group in which the aryl and alkylcarboxylic acid moieties are as defined herein.

The term "ester" as used herein may refer to compounds having the general formula: Ra—COO—Rb, wherein $R^a$ and $R^b$ denote any organic compound (such as alkyl, aryl, or silyl groups), including those bearing heteroatom containing substituent groups.

The term "carbonyl" refers to moieties possessing an aldehyde (RCHO) or a ketone (RCOR).

The term "ether" refers to a class of organic compounds that contain an oxygen atom connected to two alkyl or aryl groups. They have the general formula R—O—R', where R and R' represent the alkyl or aryl groups. Exemplary ethers include diethyl ether, dimethyl ether, methyl ethyl ether, methyl phenyl ether and polyethylene glycol (PEG). The group may be a bridging group.

The term "alkylether" means an alkyl-O-alkyl group in which the alkyl is as defined herein.

The term "alkylester" means an alkyl-ester-alkyl group in which the alkyl and ester are as defined herein.

The term "alkyletheraryl" means an alkyl-O-aryl or an aryl-O-alkyl group in which the aryl and alkyl are as defined herein.

The term "alkyletheraryl diglycidyl ether" means alkyl-O-aryl diglycidyl ether group or an aryl-O-alkyl diglycidyl ether group in which the aryl and alkyl are as defined herein. Exemplary diglycidyl ethers include 4,4'-isopropylidenediphenol diglycidyl ether.

The term "arylalkylether" means an aryl-alkyl-O— group in which the aryl and alkyl are as defined herein.

The term "optionally substituted" as used herein means the group to which this term refers may be unsubstituted, or may be substituted with one or more groups independently selected from alkyl, hydroxyalkyl, aminoalkyl, alkenyl, cycloalkyl, cycloalkenyl, —COOH, alkoxycarbonyl, hydroxyl (OH), alkoxy, alkoxyalkyl, five to six membered optionally benzo-fused heterocycloalkyl having 1 to 3 hetero atoms selected from N, O or S, C6 or C10-aryl, aryl having 6 to 10 carbon atoms, five to six ring membered optionally benzo-fused heteroaryl having 1 to 3 hetero atoms selected from N, O or S, C1-C4-alkylaryl having 6 or 10 carbon atoms in the aryl, five to six ring membered optionally benzo-fused C1-C6-alkylheteroaryl having 1 to 3 hetero atoms selected from N, O or S, pyrazolyl, imidazolyl, pyrazinyl, piperazinyl or piperidinyl; preferably, when this term is unsubstituted, the functional group may be hydrogen.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a resin formulation will now be disclosed.

The resin formulation may comprise of a resin precursor, a crosslinking additive, a photoinitiator, and at least one luminescent dye. The resin formulation may consist essentially of a resin precursor, a crosslinking additive, a photoinitiator, and at least one luminescent dye. The resin formulation may consist of a resin precursor, a crosslinking additive, a photoinitiator, and at least one luminescent dye.

The resin precursor of the resin formulation may comprise two or more acrylate functional groups. Advantageously, the presence of two or more acrylate functional groups may decrease the viscosity of the resin formulation and thus increase the solidification rate during 3D printing. Further advantageously, the presence of two or more acrylate functional groups may enhance the thermal resistance and mechanical strength of the printed 3D object.

The resin precursor may be selected from the group consisting of a base acrylate monomer, a base acrylate oligomer, a base epoxy monomer and a base epoxy oligomer.

The base acrylate monomer or oligomer may be a multifunctional or monofunctional acrylate monomer or oligomer. The base acrylate monomer or oligomer may be an aliphatic acrylate monomer or oligomer.

The base acrylate monomer may be of formula (Ia), (Ib), (Ic) or (Id):

(Ia)

(Ib)

(Ic)

(Id)

wherein $R^1$ may be hydrogen or an alkyl group;

$R^2$ in formula (Ia), (Ib) or (Ic) is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an ester group, a carbonyl group, an optionally substituted alkylether group, or an optionally substituted arylalkylether group; or $R^2$ in formula (Id) is a carbon atom.

The base acrylate monomer may be selected from the group consisting of poly(ethylene glycol) diacrylate, di(ethylene glycol) diacrylate, tri(ethylene glycol) diacrylate, tetra(ethylene glycol) diacrylate, di(propylene glycol) diacrylate, tri(propylene glycol) diacrylate and di(ethylene glycol) dimethacrylate.

Where the base acrylate may be an oligomer, the oligomer may be made up of a plurality of base acrylate monomers, each monomer being of the same general formula (Ia), (Ib), (Ic), or (Id) but may have the same or different $R^2$ substituent group therein. The $R^2$ substituent group may be as defined above. The oligomer may be made up of a plurality of base acrylate monomers, each monomer being of a different general formula (Ia), (Ib), (Ic), or (Id) with each formula having the same or different $R^2$ substituent group therein.

The base epoxy monomer may be of formula (IIa), (IIb), (IIc) or (IId):

(IIa)

(IIb)

(IIc)

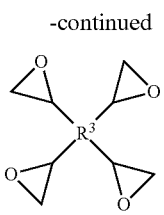

(IId)

wherein

R³ in formula (IIa), (IIb) or (IIc) is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an ester group, a carbonyl group, an optionally substituted alkylether group, or an optionally substituted arylalkylether group; or R³ in formula (IId) is a carbon atom.

The base epoxy monomer may be selected from the group consisting of poly(ethylene glycol) diglycidyl ether, di(ethylene glycol) diglycidyl ether, tri(ethylene glycol) diglycidyl ether, tetra(ethylene glycol) diglycidyl ether and poly(propylene glycol) diglycidyl ether.

The crosslinking additive may comprise a functional group selected from the group consisting of hydroxyl, alkoxyl, carboxylic acid, amine, amide, alkylacrylate, acrylate, epoxy, alkyl and heterocycloalkyl.

The crosslinking additive may be a solubilizing acrylate monomer or oligomer. The solubilizing acrylate monomer may be of a formula (IIIa):

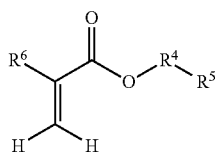

(IIIa)

wherein

R⁴ is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an ester group, an optionally substituted alkylacrylate group, an optionally substituted acrylate group, an optionally substituted alkylester group, an optionally substituted arylalkylester group, a carbonyl group, an optionally substituted alkylether group, or an optionally substituted arylalkylether group;

R⁵ is selected from the group consisting of hydroxyl, alkoxyl, carboxylic acid, amine, amide, alkylacrylate, acrylate and heterocycloalkyl; and R⁶ is hydrogen or an alkyl group.

The solubilizing acrylate monomer may be selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, 1,6-hexanediol diacrylate, tetrahydrofurfuryl methacrylate, tetrahydrofurfuryl acrylate and 2-tetrahydropyranyl acrylate.

Where the solubilizing acrylate may be an oligomer, the oligomer may comprise of one R⁴ group or a plurality of R⁴ of the same substituents or different substituents, or one R⁵ group or a plurality of R⁵ of the same substituents or different substituents independently in the general Formula (IIIa) above. The solubilizing acrylate may be an oligomer, the oligomer may comprise of one R⁴ group or a plurality of R⁴ of the same substituents or different substituents, and one R⁵ group or a plurality of R⁵ of the same substituents or different substituents independently in the general Formula (IIIa) above.

The solubilizing acrylates may be small molecular acrylates with low viscosities. The molecular weight of the small molecular acrylates may be about 80 to about 200, or about 90 to about 200, about 100 to about 200, about 110 to about 200, about 120 to about 200, about 130 to about 200, about 140 to about 200, about 150 to about 200, about 160 to about 200, about 170 to about 200, about 180 to about 200, about 190 to about 200, about 80 to about 190, about 80 to about 180, about 80 to about 170, about 80 to about 160, about 80 to about 150, about 80 to about 140, about 80 to about 130, about 80 to about 120, about 80 to about 110, about 80 to about 100, about 80 to about 90.

The viscosity of the solubilizing acrylates may be about 5 to about 50 mm2/s, or about 10 to about 50 mm²/s, about 15 to about 50 mm²/s, about 20 to about 50 mm²/s, about 25 to about 50 mm²/s, about 30 to about 50 mm²/s, about 35 to about 50 mm²/s, about 40 to about 50 mm²/s, about 45 to about 50 mm²/s, about 5 to about 45 mm²/s, about 5 to about 40 mm²/s, about 5 to about 35 mm²/s, about 5 to about 30 mm²/s, about 5 to about 25 mm²/s, about 5 to about 20 mm²/s, about 5 to about 15 mm²/s, about 5 to about 10 mm²/s.

Advantageously, the small molecular acrylates may decrease the overall viscosity of the resin formulation through disruption of the non-covalent interactions (such as hydrogen bonding, Van der Waals forces, dipole-dipole, π-π interactions and hydrophobic effects) between the stiff polymer chains.

The crosslinking additive may be a solubilizing epoxy monomer or oligomer. The solubilizing epoxy monomer may be of formula (IIIb):

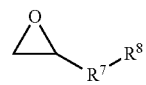

(IIIb)

wherein

R⁷ is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted alkylacrylate group, an optionally substituted acrylate group, an optionally substituted alkylester group, an optionally substituted arylalkylester group, an optionally substituted carbonyl group, an optionally substituted alkylether group, an optionally substituted alkyletheraryl group or an optionally substituted arylalkylether group; and $R^8$ is selected from the group consisting of alkyl, epoxy, hydroxyl, alkoxyl, carboxylic acid, amine, amide, alkylacrylate, acrylate and heterocycloalkyl.

The solubilizing epoxy monomer may be selected from the group consisting of poly(ethylene glycol) diglycidyl ether, poly(propylene glycol) diglycidyl ether, poly(alkylene) glycidyl ether, alkyletheraryl diglycidyl ether, 2-ethylhexyl glycidyl ether, and ortho-cresyl glycidyl ether or preferably 1,4-butanediol diglycidyl ether, 1,6-hexanediol diglycidylether, 4,4'-isopropylidenediphenol diglycidyl ether, octyl/decyl glycidyl ether and $C_8$ to $C_{12}$ alkyl glycidyl ether.

The amine may be as a curing agent or a co-curing agent. The amine may be a primary, secondary or tertiary amine. When the amine is a curing agent, the amine may be a primary or secondary amine. When the amine is a co-curing agent, the amine may be a tertiary amine. The amine may be optionally added to the resin formulation.

The amine may be of formula (IVa), (IVb), (IVc) or (IVd):

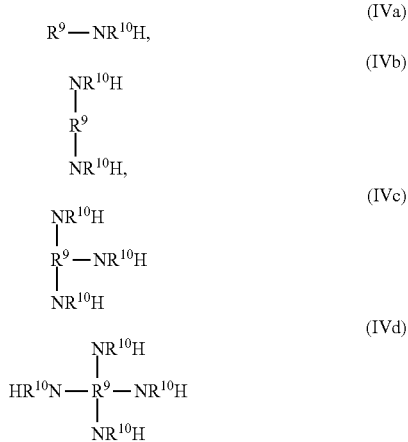

wherein $R^9$ in formula (IVa), (IVb) or (IVc) is independently an optionally substituted alkyl group, an optionally substituted alkoxyl group, an optionally substituted cycloalkyl group, an optionally substituted cycloalkenyl, an optionally substituted aryl group, a optionally substituted heteroaryl group, an optionally substituted arylalkyl group, an optionally substituted arylalkoxyl group, an optionally substituted arylalkylether group, an optionally substituted aromatic or non-aromatic heterocyclyl which is optionally heteroaryl- or aryl-fused; or $R^9$ in formula (IVd) is a carbon atom; and $R^{10}$ in formula (IVa), (IVb), (IVc) or (IVd) is independently a hydrogen, an optionally substituted alkyl group, an optionally substituted alkoxyl group, an optionally substituted cycloalkyl group, an optionally substituted cycloalkenyl, an optionally substituted aryl group, a optionally substituted heteroaryl group, an optionally substituted arylalkyl group, an optionally substituted arylalkoxyl group, an optionally substituted arylalkylether group, an optionally substituted aromatic or non-aromatic heterocyclyl which is optionally heteroaryl- or aryl-fused;

$R^9$ or $R^{10}$ in formula (IVa), (IVb) or (IVc) may independently represent an optionally substituted alkyl group, an optionally substituted alkoxyl group, an optionally substituted aryl, optionally substituted cycloalkyl, optionally substituted cycloalkenyl or optionally substituted aromatic or non-aromatic heterocyclyl which is optionally heteroaryl- or aryl-fused. $R^9$ may be a optionally substituted $C_6$ or $C_{10}$-aryl, optionally substituted $C_3$-$C_8$-cycloalkyl, optionally substituted $C_3$-$C_8$-cycloalkenyl or in each case optionally substituted and optionally heteroaryl- or benzo-fused, aromatic or non-aromatic heterocycloalkyl having in each case 5 to 7 ring members and 1 to 3 heteroatoms selected from N, O or S in the ring.

Where $R^9$ or $R^{10}$ is an optionally substituted aryl, $R^9$ or $R^{10}$ may independently represent an optionally substituted phenyl or naphthyl, optionally substituted cyclohexyl, optionally substituted cyclohexenyl, or in each case optionally substituted pyrazolyl, imidazolyl, pyrazinyl, piperazinyl or piperidinyl.

$R^9$ or $R^{10}$ may independently represent an optionally substituted alkyl or an optionally substituted alkoxyl group. $R^9$ or $R^{10}$ may be $C_1$-$C_3$-alkyl optionally substituted with halogen, hydroxyl, or cyano. $R^9$ or $R^{10}$ may be $C_1$-$C_3$-alkoxyl optionally substituted with halogen, hydroxyl, or cyano.

When the amine is a secondary amine, the tertiary amine may be added as a co-curing agent for the base epoxy monomer. The tertiary amine may be added in the presence of other curing agents. The secondary amine may be added as a co-curing agent. The other curing agents may be selected from the group consisting of ketoimine, polyamide resin, imidazole, polymercaptan, polysulfide resin, aromatic anhydrides, alicyclic anhydrides, aliphatic anhydrides and latent curing agents comprising of boron trifluoride-amine complex, dicyandiamide or organic-acid hydrazide.

When the resin precursor of the resin formulation may be the base acrylate monomer, the crosslinking additive may be the solubilizing acrylate monomer. When the resin precursor of the resin formulation may be the base epoxy monomer, the crosslinking additive may be the solubilizing epoxy monomer, the amine, or the combinations thereof. When the resin precursor may be the base epoxy monomer, the crosslinking additive may be the amine as co-curing agent in the presence of other curing agent.

When the resin precursor of the resin formulation may be the base acrylate monomer, the crosslinking additive may be the solubilizing acrylate monomer. The resin formulation may comprise of about 60% to about 95% by weight of the base acrylate monomer, about 4% to about 15% by weight of the crosslinking additive, about 0.5% to about 2% by weight of at least one photoinitiator, about 0.01% to about 0.5% by weight of at least one luminescence dyes, wherein the sum of the weight percentage of the components in the resin formulation is 100. The crosslinking additive may be the solubilizing acrylate monomer.

The weight percentage of the base acrylate monomer or oligomer having at least one acrylate functional groups may be about 60 to about 95 wt %, or about 60 to about 90 wt %, or about 60 to about 85 wt %, or about 60 to about 80 wt %, or about 60 to about 75 wt %, or about 60 to about 70 wt %, or about 60 to about 65 wt %, or about 65 to about 95 wt %, or about 70 to about 95 wt %, or about 75 to about 95 wt %, or about 80 to about 95 wt %, or about 85 to about 95 wt %, or about 90 to about 95 wt % based on the total weight of the resin composition.

The weight percentage of the solubilizing acrylate monomer or oligomer having at least one acrylate functional group may be about 4 to about 15 wt %, or about 4 to about 14 wt %, or about 4 to about 12 wt %, or about 4 to about 10 wt %, or about 4 to about 8 wt %, or about 4 to about 6 wt %, or about 6 to about 15 wt %, or about 8 to about 15 wt %, or about 10 to about 15 wt %, or about 12 to about 15 wt %, or about 14 to about 15 wt % based on the total weight of the resin composition.

When the resin precursor of the resin formulation may be the base epoxy monomer, the crosslinking additive may be the solubilizing epoxy monomer, amine, or the combinations thereof. The resin formulation may comprise of about 50% to about 99.8% by weight of the base epoxy monomer and solubilizing epoxy monomer, about 0.1% to about 5% by weight of at least one photoinitiator, about 0.1% to about 5% by weight of at least one luminescence dyes, wherein the sum of the weight percentage of the components in the resin formulation is 100.

The resin formulation may also comprise of about 20 to about 49.8% by weight of the base epoxy monomer, about 50 to about 79.8% by weight of the solubilizing epoxy monomer, about 0.1% to about 5% by weight of at least one photoinitiator, about 0.1% to about 5% by weight of at least one luminescence dyes, wherein the sum of the weight percentage of the components in the resin formulation is 100.

The weight percentage of the base epoxy monomer or oligomer having at least one epoxy functional group may be about 20 to about 49.8 wt %, about 20 to about 45 wt %, about 20 to about 40 wt %, about 20 to about 35 wt %, about 20 to about 30 wt %, about 20 to about 25 wt %, about 25 to about 49.8 wt %, about 30 to about 49.8 wt %, about 35 to about 49.8 wt %, about 40 to about 49.8 wt %, or about 45 to about 49.8 wt %.

The weight percentage of the solubilizing epoxy monomer or oligomer may be about 50 to about 79.8 wt %, about 50 to about 75 wt %, about 50 to about 70 wt %, about 50 to about 65 wt %, about 50 to about 60 wt %, about 50 to about 55 wt %, about 55 to about 79.8 wt %, about 60 to about 79.8 wt %, about 65 to about 79.8 wt %, about 70 to about 79.8 wt %, or about 75 to about 79.8 wt %.

The weight percentage of the base epoxy monomer having at least one epoxy functional group and the solubilizing epoxy monomer may be about 50 to about 99.8 wt %, or about 55 to about 99.8 wt %, or about 60 to about 99.8 wt %, or about 65 to about 99.8 wt %, or about 70 to about 99.8 wt %, or about 75 to about 99.8 wt %, or about 80 to about 99.8 wt %, or about 85 to about 99.8 wt %, or about 90 to about 99.8 wt %, or about 50 to about 55 wt %, or about 50 to about 60 wt %, or about 50 to about 65 wt %, or about 50 to about 70 wt %, or about 50 to about 75 wt %, or about 50 to about 80 wt %, or about 50 to about 85 wt %, or about 50 to about 90 wt % based on the total weight of the resin composition.

The weight percentage of the amine having at least one amine functional group may be about 0 to about 50 wt %, or about 5 to about 50 wt %, or about 10 to about 50 wt %, or about 15 to about 50 wt %, or about 20 to about 50 wt %, or about 25 to about 50 wt %, or about 30 to about 50 wt %, or about 35 to about 50 wt %, or about 40 to about 50 wt %, or about 45 to about 50 wt %, or about 0 to about 5 wt %, or about 5 to about 10 wt %, or about 5 to about 15 wt %, or about 5 to about 20 wt %, or about 5 to about 25 wt %, or about 5 to about 30 wt %, or about 5 to about 35 wt %, or about 5 to about 40 wt %, or about 5 to about 45 wt % based on the total weight of the resin composition.

The photoinitiator may be a cationic, anionic or neutral species initiator. When the resin precursor of the resin formulation is a base acrylate monomer, the photoinitiator may be a neutral species initiator. When the resin precursor of the resin formulation is a base epoxy monomer, the photoinitiator may be a cationic initiator.

The photoinitiator may be selected from the group consisting of bis(2,4,6-trimethyl benzoyl)phenylphosphine oxide (IRGACURE 819), benzoyl-diphenylphosphine oxide (BDPO), 2,4,6-trimethylbenzoyl-methoxy-phenylphosphine oxide (TMMPO), 2,4,6-trimethylbenzoyldiphenyl phosphine (TPO), 2-hydroxy-2-methyl-1-phenyl-1-propane (DAROCUR 1173), benzophenone (BP), 4,4'-bis(diethylamino)benzophenone, phenanthrenequinone, 2-chlorothioxanthen-9-one, 4,4'-bis(dimethylamino)-benzophenone, diphenyliodonium hexafluorophosphate, (4-tert-butylphenyl)diphenylsulfonium triflate, diphenyliodonium nitrate, diphenyliodonium p-toluenesulfonate, (4-fluorophenyl)diphenylsulfonium triflate, triphenylsulfonium triflate and bis (4-tert-butylphenyl)iodonium trifluoromethanesulfonate (DtBPIT).

The weight percentage of the photoinitiator may be about 0.5 to about 2.0 wt %, or about 0.6 to about 2.0 wt %, or about 0.7 to about 2.0 wt %, or about 0.8 to about 2.0 wt %, or about 0.9 to about 2.0 wt %, or about 1.0 to about 2.0 wt %, or about 1.1 to about 2.0 wt %, or about 1.2 to about 2.0 wt %, or about 1.3 to about 2.0 wt %, or about 1.4 to about 2.0 wt %, or about 1.5 to about 2.0 wt %, or about 1.6 to about 2.0 wt %, or about 1.7 to about 2.0 wt %, or about 1.8 to about 2.0 wt %, or about 1.9 to about 2.0 wt %, or about 0.5 to about 0.6 wt %, or about 0.5 to about 0.7 wt %, or about 0.5 to about 0.8 wt %, or about 0.5 to about 0.9 wt %, or about 0.5 to about 1.0 wt %, or about 0.5 to about 1.1 wt %, or about 0.5 to about 1.2 wt %, or about 0.5 to about 1.3 wt %, or about 0.5 to about 1.4 wt %, or about 0.5 to about 1.5 wt %, or about 0.5 to about 1.6 wt %, or about 0.5 to about 1.7 wt %, or about 0.5 to about 1.8 wt %, or about 0.5 to about 1.9 wt % based on the total weight of the resin composition.

The luminescent dye may comprise an organic dye, an inorganic luminescence material or a combination thereof.

The organic dye may be selected from the group consisting of diaminostilbenesulfonic acid, distilbene, benzidine, benzidinesulfonic acid, diaminofluorene, imidazolone, triazole, p-quaterphenyl, p-terphenyl, 2,5-diphenyloxazole, 2-(1-naphthyl)-5-phenyloxazole, 2-phenyl-5-(4-biphenyl)-1,3,4-oxadiazole, 3-phenyl-7-(1,2-2H-naphthotriazolyl)-coumarin, 3,7-bis(diethylamino)-phenoxazonium nitrate, 3,7-bis(diethylamino)phenoxazonium nitrate, europium-thenoyltrifluoroacetone chelate, basic yellow, rhodamine B, 6-bromoacetyl-2-dimethylaminonaphthalene; 5-carboxyfluorescein; 5 or 6-carboxyfluorescein; 6-carboxyfluorescein; fluorescein-6-isothiocyanate; 6-carboxy-2',4,4',5',7,7'-hexachlorofluorescein, 6-carboxy-2',4,7,7'-tetrachlorofluorescein, and tetramethylrhodamine-5-(and 6)-isothiocyanate.

The inorganic luminescence material may be selected from the group consisting of $BaTiO_3/Yb$, $La_2O_3/Yb$, $La_2O_3/Er$, $Lu_2O_3/Yb$, $Lu_2O_3/Er$, $Y_2O_3/Yb$, $Y_2O_3/Er$, $SrS/Ce$, $Lu_3Al_5O_{12}$, $Y_3Al_5O_{12}/Ce$, $SrB_4O_7/Eu$, $Sr_2P_2O_7/Eu$, $BaMgAl_{10}O_{17}/Eu$, $SrAl_2O_4/Eu$, $CaGa_2S_4$, $Sr_2Si_5N_8/Eu$, $CaWO_4$, $MgWO_4$, luminescent quantum dot consisting of CdSe, CdTe, CdS, PbSe, InP/ZnS; ZnSe/ZnS; CdSe/ZnS; CdSe/ZnS; CdTs/ZnS; CdSe/ZnO and luminescent dyes doped silica or titania nanoparticles.

The weight percentage of the luminescent dye may be about 0.01 to about 0.50 wt %, or about 0.01 to about 0.05 wt %, or about 0.01 to about 0.10 wt %, or about 0.01 to about 0.15 wt %, or about 0.01 to about 0.20 wt %, or about 0.01 to about 0.25 wt %, or about 0.01 to about 0.30 wt %, or about 0.01 to about 0.35 wt %, or about 0.01 to about 0.40 wt %, or about 0.01 to about 0.45 wt %, or about 0.45 to about 0.50 wt %, or about 0.40 to about 0.50 wt %, or about 0.35 to about 0.50 wt %, or about 0.30 to about 0.50 wt %, or about 0.25 to about 0.50 wt %, or about 0.20 to about 0.50 wt %, or about 0.15 to about 0.50 wt %, or about 0.10 to about 0.50 wt %, or about 0.05 to about 0.50 wt % based on the total weight of the resin composition.

The resin formulation may be one as defined above, and may further comprise at least one photoabsorber. The photoabsorber may be optionally added to the resin formulation. The photoabsorber of the resin formulation may be a photostabilizer.

The photostabilizer may be selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}-diazenyl]naphthalen-2-ol (sudan IV), (2,2-dimethyl-1,3-dihydroperimidin-6-yl)-(4-phenylazo-1-naphthyl)diazene (sudan black B), 1-(2-methoxyphenylazo)-2-naphthol (sudan red G), 2,5-bis(5-tert-butyl-benzoxazol-2-yl)thiophene, 4-methoxyphenol and butylatedhydroxytoluene.

The weight percentage of the photoabsorber compound may be 0 to about 0.5 wt %, 0 to about 0.4 wt %, 0 to about 0.3 wt %, 0 to about 0.2 wt %, 0 to about 0.1 wt %, about 0.1 to about 0.5 wt %, about 0.2 to about 0.5 wt %, about 0.3 to about 0.5 wt %, about 0.4 to about 0.5 wt %, about 0.01 to about 0.1 wt %, about 0.02 to about 0.1 wt %, about 0.03 to about 0.1 wt %, about 0.04 to about 0.1 wt %, about 0.05 to about 0.1 wt %, about 0.06 to about 0.1 wt %, about 0.07 to about 0.1 wt %, about 0.08 to about 0.1 wt %, about 0.09 to about 0.1 wt %, greater than 0 to about 0.09 wt %, greater than 0 to about 0.08 wt %, greater than 0 to about 0.07 wt %, greater than 0 to about 0.06 wt %, greater than 0 to about 0.05 wt %, greater than 0 to about 0.04 wt %, greater than 0 to about 0.03 wt %, greater than 0 to about 0.02 wt %, greater than 0 to about 0.01 wt %, about 0.02 to about 0.03 wt %, or 0 to about 0.008 wt % based on the total weight of the resin composition. The weight percentage of the photoabsorber compound may be greater than 0 to about 0.5 wt %.

Exemplary, non-limiting embodiments of a method of preparing a resin formulation will now be disclosed. The method comprises the step of stirring a resin precursor, a crosslinking additive, a photoinitiator, and at least one luminescent dye in the absence of light for a period of time to form a reaction mixture; and optionally ultrasonicating the reaction mixture.

The method of preparing the resin formulation may comprise the addition of the resin precursor, the crosslinking additive, the photoinitiator, and at least one luminescent dye into a reaction vessel in a sequential order.

When the crosslinking additive is the solubilizing epoxy monomer, an amine may be added to the resin formulation. The addition of the amine may be an optional step. Advantageously, the addition of an amine may strengthen the curing of the resin formulation by enhancing the crosslinking of the epoxy resins. More advantageously, the presence of the amine may decrease the viscosity, thereby increasing the solidification rate of the resin formulation during 3D printing.

The addition of the photoabsorber may be an optional step. The photoabsorber may be added just before the luminescent dye. The photoabsorber may be added last into the reaction vessel.

The reaction mixture may be stirred for about 6 to about 26 hours, or about 6 to about 25 hours, or about 6 to about 24 hours, or about 6 to about 23 hours, or about 6 to about 22 hours, or about 6 to about 21 hours, or about 6 to about 20 hours, or about 6 to about 19 hours, or about 6 to about 18 hours, or about 6 to about 17 hours, or about 6 to about 16 hours, or about 6 to about 15 hours, or about 6 to about 14 hours, or about 6 to about 13 hours, or about 6 to about 12 hours, or about 6 to about 11 hours, or about 6 to about 10 hours, or about 6 to about 9 hours, or about 6 to about 8 hours, or about 6 to about 7 hours, or about 7 to about 26 hours, or about 8 to about 26 hours, or about 9 to about 26 hours, or about 10 to about 26 hours, or about 11 to about 26 hours, or about 12 to about 26 hours, or about 13 to about 26 hours, or about 14 to about 26 hours, or about 15 to about 26 hours, or about 16 to about 26 hours, or about 17 to about 26 hours, or about 18 to about 26 hours, or about 19 to about 26 hours, or about 20 to about 26 hours, or about 21 to about 26 hours, or about 22 to about 26 hours, or about 23 to about 26 hours, or about 24 to about 26 hours, or about 25 to about 26 hours or preferably about 8 to 24 hours.

The reaction mixture may be stirred at a temperature in the range of about 20 to about 28° C., or about 20 to about 27° C., or about 20 to about 26° C., or about 20 to about 25° C., or about 20 to about 24° C., or about 20 to about 23° C., or about 20 to about 22° C., or about 20 to about 21° C., or about 21 to about 28° C., or about 22 to about 28° C., or about 23 to about 28° C., or about 24 to about 28° C., or about 25 to about 28° C., or about 26 to about 28° C., or about 27 to about 28° C., or preferably at room temperature.

Ultrasonification may be used to help ensure that the resin precursor, crosslinking additive, photoinitiator, luminescent dye(s) and optional photoabsorber are mostly or completely dissolved.

Exemplary, non-limiting embodiments of a method of printing a luminescent object will now be disclosed. The method of printing the luminescent object comprises the step of exposing the resin formulation as defined above to a light source.

The light source may be selected from the group consisting of visible light, infra-red radiation and ultraviolet radiation.

Exemplary, non-limiting embodiments of the use of the resin formulation as defined above as a material for 3D printing will now be disclosed.

The 3D printing may be executed by any 3D printer that is suitable with the resin formulation as defined above. The 3D printer may be Little RP printer. The 3D printer may be any printer that is of equivalence to the Little RP printer.

Exemplary, non-limiting embodiments of a three-dimensional printed article comprising the resin formulation as defined above, wherein said resin formulation is in a cured state will now be disclosed.

The 3D printed article may be any 3D objects that are of interest.

Exemplary, non-limiting embodiments of a method of tuning a colour of a three-dimensional printed article will now be disclosed. The method may comprise the step of mixing a resin precursor, a crosslinking additive, a photoinitiator, and two or more luminescent dyes in the absence of light.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 shows a number of vase structures that were printed by digital light processing (DLP) technique based on luminescent resins with (a) red, (b) green and (c) blue luminescent colours.

FIG. 2 shows a comparison of dyes dispersion in acrylate resins with (a) cross-linking additives and (b) without cross-linking additives.

FIG. 3 shows a number of honeycomb structures printed using a master batch of the luminescent resins with blue (2), yellow (4) and red (6) luminescent colours.

FIG. 4 shows the various luminescent colours of the resin developed for 3D printing where (a) is red, (b) is yellow, (c) is green, (d) is blue, (e) is indigo and (f) is violet.

FIG. 5 shows the white luminescent colour of the resin developed for 3D printing.

FIG. 6 shows a number of 3D printed honeycomb objects using photopolymer resin with red luminescence (IMRE-F-R) (a) before and (b) after UV irradiation.

FIG. 7 shows a number of 3D printed honeycomb objects using photopolymer resin with green luminescence (IMRE-F-G) (a) before and (b) after UV irradiation.

FIG. 8 shows a number of 3D printed honeycomb objects using photopolymer resin with blue luminescence (IMRE-F-B) (a) before and (b) after UV irradiation.

FIG. 9 shows a number of 3D printed honeycomb objects using photopolymer resin with yellow luminescence (IMRE-E-Y) (a) before and (b) after UV irradiation.

FIG. 10 shows a number of 3D printed honeycomb objects using photopolymer resin with blue luminescence (IMRE-E-B) (a) before and (b) after UV irradiation.

FIG. 11 shows a number of 3D printed honeycomb objects by using photopolymer resin with inorganic green quantum dot (IMRE-F-QD) (a) before and (b) after UV irradiation.

DETAILED DESCRIPTION OF DRAWINGS

Referring to FIG. 1, FIG. 1(a) is a red luminescent coloured vase printed with red luminescent resin, FIG. 1(b) is a green luminescent coloured vase printed with green luminescent resin and FIG. 1c) is a blue luminescent coloured vase printed with blue luminescent resin.

Referring to FIG. 2, FIG. 2(a) shows dye dispersion of acrylate resins with a cross-linking additive while FIG. 2(b) shows dye dispersion of acrylate resins without the cross-linking additive. When comparing FIG. 2(a) and FIG. 2(b), a more transparent resin was obtained when the cross-linking additives were used. Hence, by using the cross-linking additives, the additives help to homogeneously disperse both organic and inorganic dyes in most acrylate resins, resulting in a more transparent resin.

Referring to FIG. 3, the blue luminescent coloured honeycomb structure was printed with the master batch luminescent resin with blue luminescent colour (2), the green/yellow luminescent coloured honeycomb structure was printed with the master batch luminescent resins with green luminescent colour (4) and the red luminescent coloured honeycomb structure was printed with the master batch luminescent resins with red luminescent colour (6).

Referring to FIG. 4, the various luminescent colours are (a) red, (b) yellow, (c) green, (d) blue, (e) indigo and (f) violet. The resin with (b) yellow luminescent colour was developed with a resin formulation composition of: 60 to 80% by weight of multifunctional aliphatic acrylate (basic monomer/oligomer to give satisfied thermal/mechanical properties of the printed object), 20 to 40% by weight of special additives that help to disperse the luminescent dyes homogeneously, 0.1 to 5% by weight of at least one photoinitiator, 0 to 0.1% by weight of one photo absorber, 0.1 to 5% by weight of a red luminescence material such as rhodamine B and a green luminescence material such as fluorescein. The resin with (e) indigo luminescent colour was developed with a resin formulation composition of: 60 to 80% by weight of multifunctional aliphatic acrylate (basic monomer/oligomer to give satisfied thermal/mechanical properties of the printed object), 20 to 40% by weight of special additives that help to disperse the luminescent dyes homogeneously, 0.1 to 5% by weight of at least one photoinitiator, 0 to 0.1% by weight of one photo absorber, 0.1 to 5% by weight of a green luminescence material such as fluorescein and a blue luminescence material such as 2,5-bis(5-tert-butyl-benzoxazol-2-yl)thiophene. The resin with (f) violet luminescent colour was developed with a resin formulation composition of: 60 to 80% by weight of multifunctional aliphatic acrylate (basic monomer/oligomer to give satisfied thermal/mechanical properties of the printed object), 20 to 40% by weight of special additives that help to disperse the luminescent dyes homogeneously, 0.1 to 5% by weight of at least one photoinitiator, 0 to 0.1% by weight of one photo absorber, 0.1 to 5% by weight of a red luminescence material such as rhodamine B and a blue luminescence material such as 2,5-bis(5-tert-butyl-benzoxazol-2-yl)thiophene.

Referring to FIG. 5, the white luminescent polymers resin with strong luminescence was developed by using a resin formulation composition of: 60 to 80% by weight of multifunctional aliphatic acrylate (basic monomer/oligomer to give satisfied thermal/mechanical properties of the printed object), 20 to 40% by weight of special additives that help to disperse the luminescent dyes homogeneously, 0.1 to 5% by weight of at least one photoinitiator, 0 to 0.1% by weight of one photo absorber, 0.1 to 5% by weight of a red luminescence material such as rhodamine B, a green luminescence material such as fluorescein and a blue luminescence material such as 2,5-bis(5-tert-butyl-benzoxazol-2-yl)thiophene.

Referring to FIG. 6, FIG. 6(a) shows the 3D honeycomb object printed using IMRE-F-R resin before the ultraviolet (UV) irradiation and FIG. 6(b) shows the 3D honeycomb object after ultraviolet (UV) irradiation. The IMRE-F-R resin used was an acrylate-based resin. The UV irradiation was performed under a UV lamp at 365 nm. In FIG. 6(a), the colour of the 3D printed object before UV irradiation was red without any luminescent effect. In FIG. 6(b), the 3D printed object after UV irradiation displayed a luminescent red colour. This may be a photoluminescence process wherein the luminescent dye absorbs photons and emit light (i.e., electromagnetic radiation).

Referring to FIG. 7, FIG. 7(a) shows the 3D honeycomb object printed using IMRE-F-G resin before the ultraviolet (UV) irradiation and FIG. 7(b) shows the 3D honeycomb object after ultraviolet (UV) irradiation. The IMRE-F-G resin used was an acrylate-based resin. The UV irradiation was performed under a UV lamp at 365 nm. In FIG. 7(a), the colour of the 3D printed object before UV irradiation was yellow without any luminescent effect. In FIG. 7(b), the 3D printed object after UV irradiation displayed a luminescent green colour. This may be a photoluminescence process wherein the luminescent dye absorbs photons and emit light (i.e., electromagnetic radiation).

Referring to FIG. 8, FIG. 8(a) shows the 3D honeycomb object printed using IMRE-F-B resin before the ultraviolet (UV) irradiation and FIG. 8(b) shows the 3D honeycomb object after ultraviolet (UV) irradiation. The IMRE-F-B resin used was an acrylate-based resin. The UV irradiation was performed under a UV lamp at 365 nm. In FIG. 8(a), the colour of the 3D printed object before UV irradiation was yellow without any luminescent effect. In FIG. 8(b), the 3D printed object after UV irradiation displayed a luminescent blue colour. This may be a photoluminescence process wherein the luminescent dye absorbs photons and emit light (i.e., electromagnetic radiation).

Referring to FIG. 9, FIG. 9(a) shows the 3D lamp-shaped object printed using IMRE-E-Y resin before the ultraviolet (UV) irradiation and FIG. 9(b) shows the 3D lamp-shaped object after ultraviolet (UV) irradiation. The IMRE-E-Y resin used was an epoxy-based resin. The UV irradiation was performed under a UV lamp at 365 nm. In FIG. 9(a), the colour of the 3D printed object before UV irradiation was yellow without any luminescent effect. In FIG. 9(b), the 3D printed object after UV irradiation displayed a luminescent yellow colour. This may be a photoluminescence process wherein the luminescent dye absorbs photons and emit light (i.e., electromagnetic radiation).

Referring to FIG. 10, FIG. 10(a) shows the 3D lamp-shaped object printed using IMRE-E-B resin before the ultraviolet (UV) irradiation and FIG. 10(b) shows the 3D lamp-shaped object after ultraviolet (UV) irradiation. The IMRE-E-B resin used was an epoxy-based resin. The UV irradiation was performed under a UV lamp at 365 nm. In FIG. 10(a), the colour of the 3D printed object before UV irradiation was yellow without any luminescent effect. In FIG. 10(b), the 3D printed object after UV irradiation displayed a luminescent blue colour. This may be a photoluminescence process wherein the luminescent dye absorbs photons and emit light (i.e., electromagnetic radiation).

Referring to FIG. 11, FIG. 11(a) shows the 3D honeycomb object printed using IMRE-F-QD resin before the ultraviolet (UV) irradiation and FIG. 11(b) shows the 3D honeycomb object after the ultraviolet (UV) irradiation. The IMRE-F-QD resin used was an acrylate-based resin. The UV irradiation was performed under a UV lamp at 365 nm. In FIG. 11(a), the colour of the 3D printed object before UV irradiation was yellow without any luminescent effect. In FIG. 11(b), the 3D printed object after UV irradiation displayed a luminescent yellow colour. This may be a photoluminescence process wherein the luminescent dye absorbs photons and emit light (i.e., electromagnetic radiation).

EXAMPLES

Non-limiting examples of the invention will be further described in greater detail by reference to specific Examples, which should not be construed as in any way limiting the scope of the invention.

Materials and Methods

The DLP 3D printer for the resin test was LittleRP using a DLP projector (Brand & model: Acer P1283) as the light source and Creation Workshop as printing control software. Printing was carried out with slice thickness of 0.05 mm and five bottom layers to enhance the adhesion of printed parts on the printing platform. UV-Vis-NIR spectra were recorded on a Shimadzu model 2501-PC. Fluorescence spectra were measured on a Perkin Elmer LS 45 fluorescence spectrometer. Di(ethylene glycol) diacrylate (75%), hexanediol diacrylate (80%), 2-carboxyethyl acrylate oligomers (n50-3, average MW 170), tetrahydrofurfuryl methacrylate (97%), phenylbis(2,4,6-trimethylbenzoyl)phosphine oxide (97%), sudan I (95%), rhodamine B (95%) and 2,5-bis(5-tert-butyl-benzoxazol-2-yl)thiophene (99%) (BBOT) were purchased from Sigma-Aldrich (St. Louis, Mo., United States) and used directly. Solvent yellow 98 was donated by Clariant (Muttenz, Switzerland) and used directly.

Example 1

Preparation of Photopolymer Resin with Red Luminescence (IMRE-F-R)

Di(ethylene glycol) diacrylate (92.6377 wt %), 2-carboxyethyl acrylate oligomers (4.8757 wt %), phenylbis(2,4,6-trimethylbenzoyl)phosphine oxide (1.9503 wt %), 1-phenylazo-2-naphthol (0.0488 wt %) and rhodamine B (0.4876 wt %) were weighted into a flask in sequence and stirred in the absence of light for 8 to 24 hours until all solid contents were fully dissolved. Ultrasonication may be used during mixing to help dissolve the solid contents.

Preparation of Photopolymer Resin with Green Luminescence (IMRE-F-G)

Di(ethylene glycol) diacrylate (84.0752 wt %), 1,6-hexanediol diacrylate (14.8368 wt %), phenylbis (2,4,6-trimethylbenzoyl)phosphine oxide (0.9891 wt %) and fluorescein (0.0989 wt %) were weighted into a flask in sequence and stirred in the absence of light for 8 to 24 hours until all solid contents were fully dissolved. Ultrasonication may be used during mixing to help dissolve the solid contents.

Preparation of Photopolymer Resin with Blue Luminescence (IMRE-F-B)

Di(ethylene glycol) diacrylate (88.6634 wt %), tetrahydrofurfuryl methacrylate (9.8515 wt %), phenylbis(2,4,6-trimethylbenzoyl)phosphine oxide (0.9851 wt %), 1-Phenylazo-2-naphthol (0.007389 wt %), 2,5-Bis(5-tert-butyl-benzoxazol-2-yl)thiophene (0.4926 wt %) were weighted into a flask in sequence and stirred in the absence of light for 8 to 24 hours until all solid contents were fully dissolved. Ultrasonication may be used during mixing to help dissolve the solid contents.

Preparation of Epoxy Resin with Yellow Luminescence (IMRE-E-Y)

4,4'-Isopropylidenediphenol diglycidyl ether (D.E.R. 332, 30 wt %), 1,4-butanediol diglycidyl ether (56 wt %), octyl/decyl glycidyl ether (10.5 wt %) diphenyliodonium hexafluorophosphate (DPIHFP, 3.1 wt %) and fluorescein (0.15 wt %), Sudan I (0.05 wt %), and rhodamine B (0.2 wt %) were weighted into a flask in sequence and stirred in the absence of light for 8 to 24 hours until all solid contents were fully dissolved. Ultrasonication may be used during mixing to help dissolve the solid contents.

Preparation of Epoxy Resin with Blue Luminescence (IMRE-E-B)

4,4'-Isopropylidenediphenol diglycidyl ether (D.E.R. 332, 30 wt %), 1,4-butanediol diglycidyl ether (56 wt %), Octyl/decyl glycidyl ether (10.5 wt %) diphenyliodonium hexafluorophosphate (DPIHFP, 3.0 wt %), Sudan I (0.01 wt %), 2,5-bis(5-tert-butyl-benzoxazol-2-yl)thiophene (0.49 wt %) were weighted into a flask in sequence and stirred in the absence of light for 8 to 24 hours until all solid contents were fully dissolved. Ultrasonication may be used during mixing to help dissolve the solid contents.

Preparation of Photopolymer Resin with Inorganic Green Quantum Dot (IMRE-F-QD)

Di(ethylene glycol) diacrylate (9.5 g, 93.82%), 2-carboxyethyl acrylate oligomers (0.5 g, 4.9378 wt %) and acid capped GA-CdSe/ZnS quantum dot (25 mg in 1 mL of CHCl3) were weighted and mixed into a flask, and CHCl3 was removed under reduced pressure. Phenylbis(2,4,6-trimethylbenzoyl)phosphine oxide (100 mg, 0.9876%) and 1-phenylazo-2-naphthol (0.007389 wt %) were then added and the mixture was stirred in the absence of light for 8 to 24 hours until all solid contents were fully dissolved. Ultrasonication may be used during mixing to help dissolve the solid contents.

Example 2

3D Printing of Honeycomb Object Using IMRE-F-R Resin

Stereo-lithography printing was accomplished by using the 3D printer and photopolymer resin with red luminescence (IMRE-F-R resin formulated above).

The printing parameters were slice thickness: 0.050 mm; exposure time per layer: 2000 ms; and bottom layers exposure time: 4000 ms×5 layers. The final honeycomb object is shown in FIG. 6.

3D Printing of Honeycomb Object Using IMRE-F-G Resin

Stereo-lithography printing was accomplished by using the 3D printer and photopolymer resin with green luminescence (IMRE-F-G resin formulated above).

The printing parameters were slice thickness: 0.050 mm; exposure time per layer: 6000 ms; and bottom layers exposure time: 8000 ms×5 layers. The final honeycomb object is shown in FIG. 7.

3D Printing of Honeycomb Object Using IMRE-F-B Resin

Stereo-lithography printing was accomplished by using the 3D printer and photopolymer resin with blue luminescence (IMRE-F-B resin formulated above).

The printing parameters were slice thickness: 0.050 mm; exposure time per layer: 5000 ms; and bottom layers exposure time: 8000 ms×5 layers. The final honeycomb object is shown in FIG. 8.

3D Printing of Lamp-Shaped Object Using IMRE-E-Y Resin

Stereo-lithography printing was accomplished by using the 3D printer and epoxy resin with yellow luminescence (IMRE-E-Y resin formulated above).

The printing parameters were slice thickness: 0.050 mm; exposure time per layer: 8000 ms; and bottom layers exposure time: 8000 ms×5 layers. The final honeycomb object is shown in FIG. 9.

3D Printing of Lamp-Shaped Object Using IMRE-E-B Resin

Stereo-lithography printing was accomplished by using the 3D printer and epoxy resin with blue luminescence (IMRE-E-B resin formulated above).

The printing parameters were slice thickness: 0.050 mm; exposure time per layer: 8000 ms; and bottom layers exposure time: 8000 ms×5 layers. The final honeycomb object is shown in FIG. 10.

3D Printing of Honeycomb Object Using IMRE-F-QD Resin

Stereo-lithography printing was accomplished by using the 3D printer and photopolymer resin with inorganic green quantum dot (IMRE-F-QD resin). The printing parameters were slice thickness: 0.050 mm; exposure time per layer: 3000 ms; and bottom layers exposure time: 5000 ms×5 layers. The final honeycomb object is shown in FIG. 11.

INDUSTRIAL APPLICABILITY

The resin formulation of the present disclosure may be used in 3D printing. For example, the resin formulation may be used as a resin in 3D printing techniques such as Stereolithography (SLA) or Digital Light Processing (DLP). The luminescent 3D printed objects produced from the resin formulations of the present disclosure may be used to develop colourful jewelleries or ornaments as well as potential ultraviolet light converter.

Moreover, besides the application for 3D printing, the resin formulation may be used in lighting application. For example, the luminescent resins may be used to serve as a light source on pavement or roads at night. The luminescent resins may be also be used to develop fluorescent light bulbs.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A resin formulation consisting essentially of components a) a resin precursor, b) a crosslinking additive, c) at least one photoinitiator, d) at least one luminescent dye, and optionally e) a photoabsorber, wherein the crosslinking additive of b) comprises a functional group selected from the group consisting of hydroxyl, alkoxyl, carboxylic acid, amine, amide, alkylacrylate, acrylate, epoxy, alkyl, and heterocycloalkyl.

2. The resin formulation of claim 1, wherein the resin precursor is selected from the group consisting of a base acrylate monomer, a base acrylate oligomer, a base epoxy monomer, a solubilizing epoxy monomer, and a base epoxy oligomer.

3. The resin formulation of claim 2, wherein the base acrylate monomer is of formula (Ia), (Ib), (Ic), or (Id):

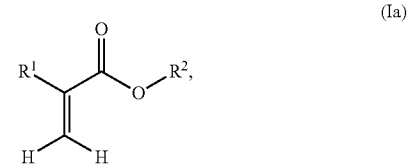

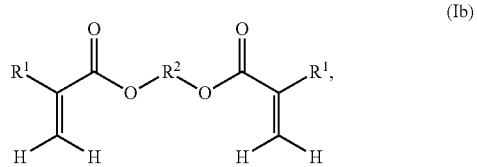

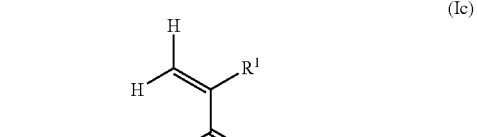

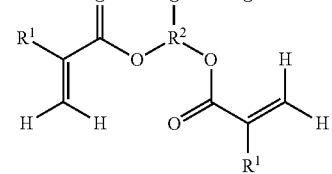

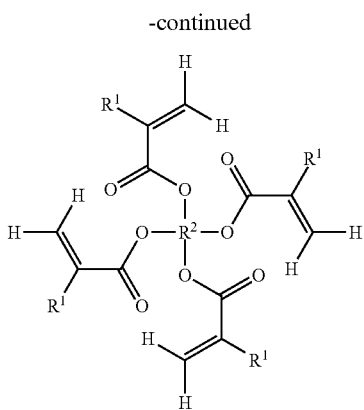

wherein
R¹ is hydrogen or an alkyl group;
R² in formula (Ia), (Ib), or (Ic) is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted carbonyl group, an optionally substituted alkylether group, or an optionally substituted arylalkylether group; or
R² in formula (Id) is a carbon atom.

4. The resin formulation of claim 2, wherein the base acrylate monomer is selected from the group consisting of poly(ethylene glycol) diacrylate, di(ethylene glycol) diacrylate, tri(ethylene glycol) diacrylate, tetra(ethylene glycol) diacrylate, and di(ethylene glycol) dimethacrylate.

5. The resin formulation of claim 2, wherein the base epoxy monomer is of formula (IIa), (IIb), (IIc), or (IId):

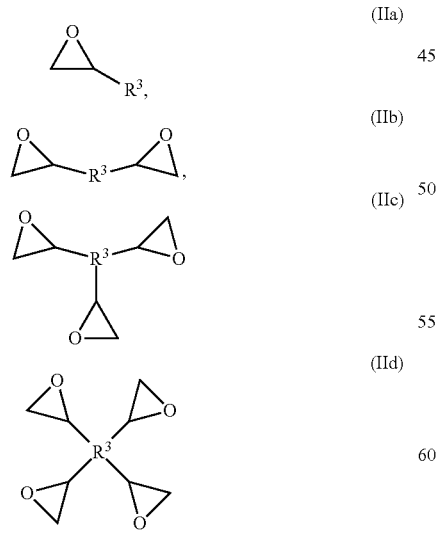

wherein
R³ in formula (IIa), (IIb), or (IIc) is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted carbonyl group, an optionally substituted alkylether group, or an optionally substituted arylalkylether group; or
R³ in formula (IId) is a carbon atom.

6. The resin formulation of claim 2, wherein the base epoxy monomer is selected from the group consisting of poly(ethylene glycol) diglycidyl ether, di(ethylene glycol) diglycidyl ether, tri(ethylene glycol) diglycidyl ether, tetra(ethylene glycol) diglycidyl ether, and poly(propylene glycol) diglycidyl ether.

7. The resin formulation of claim 1, wherein the crosslinking additive comprises a solubilizing acrylate monomer or oligomer or wherein the crosslinking additive comprises a solubilizing epoxy monomer or oligomer.

8. The resin formulation of claim 7, wherein the solubilizing acrylate monomer is of formula (IIIa):

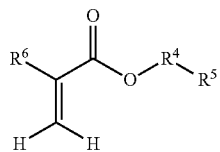

wherein
R⁴ is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted alkylacrylate group, an optionally substituted acrylate group, an optionally substituted alkylester group, an optionally substituted arylalkylester group, an optionally substituted carbonyl group, an optionally substituted alkylether group, or an optionally substituted arylalkylether group;
R⁵ is selected from the group consisting of hydroxyl, alkoxyl, carboxylic acid, amine, amide, alkylacrylate, acrylate, and heterocycloalkyl; and
R⁶ is hydrogen or an alkyl group.

9. The resin formulation of claim 7, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, 1,6-hexanediol diacrylate, tetrahydrofurfuryl methacrylate, tetrahydrofurfuryl acrylate, and 2-tetrahydropyranyl acrylate.

10. The resin formulation of claim 7, wherein the solubilizing epoxy monomer is of formula (IIIb):

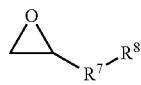

(IIIb)

wherein
R[7] is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted alkylacrylate group, an optionally substituted acrylate group, an optionally substituted alkylester group, an optionally substituted arylalkylester group, an optionally substituted carbonyl group, an optionally substituted alkylether group, an optionally substituted alkyletheraryl group, or an optionally substituted arylalkylether group; and
R[8] is selected from the group consisting of alkyl, epoxy, hydroxyl, alkoxyl, carboxylic acid, amine, amide, alkylacrylate, acrylate, and heterocycloalkyl.

11. The resin formulation of claim 7, wherein the solubilizing epoxy monomer is selected from the group consisting of poly(ethylene glycol) diglycidyl ether, poly(propylene glycol) diglycidyl ether, poly(alkylene) glycidyl ether, alkyletheraryl diglycidyl ether, 2-ethylhexyl glycidyl ether, and ortho-cresyl glycidyl ether.

12. The resin formulation of claim 2, wherein when the resin precursor is the base acrylate monomer, the crosslinking additive is the solubilizing acrylate monomer, or wherein when the resin precursor is the epoxy monomer, the crosslinking additive is the solubilizing epoxy monomer, amine or the combinations thereof or wherein the amine is of formula (IVa), (IVb), (IVc), or (IVd):

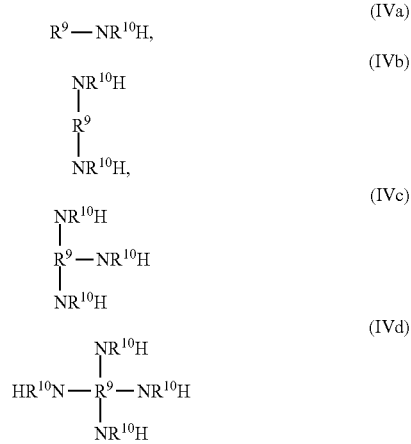

wherein
R[9] in formula (IVa), (IVb), or (IVc) is independently an optionally substituted alkyl group, an optionally substituted alkoxyl group, an optionally substituted cycloalkyl group, an optionally substituted cycloalkenyl, an optionally substituted aryl group, a optionally substituted heteroaryl group, an optionally substituted arylalkyl group, an optionally substituted arylalkoxyl group, an optionally substituted arylalkylether group, an optionally substituted aromatic or non-aromatic heterocyclyl which is optionally heteroaryl- or aryl-fused; or
R[9] in formula (IVd) is a carbon atom; and
R[10] in formula (IVa), (IVb), (IVc), or (IVd) is independently a hydrogen, an optionally substituted alkyl group, an optionally substituted alkoxyl group, an optionally substituted cycloalkyl group, an optionally substituted cycloalkenyl, an optionally substituted aryl group, a optionally substituted heteroaryl group, an optionally substituted arylalkyl group, an optionally substituted arylalkoxyl group, an optionally substituted arylalkylether group, an optionally substituted aromatic or non-aromatic heterocyclyl which is optionally heteroaryl- or aryl-fused.

13. The resin formulation of claim 1, wherein the photoinitiator is selected from the group consisting of bis(2,4,6-trimethyl benzoyl)phenylphosphine oxide (IRGACURE 819), benzoyl-diphenylphosphine oxide (BDPO), 2,4,6-trimethylbenzoyl-methoxy-phenylphosphine oxide (TMMPO), 2,4,6-trimethylbenzoyldiphenyl phosphine (TPO), 2-hydroxy-2-methyl-1-phenyl-1-propane (DAROCUR 1173), benzophenone (BP), 4,4'-bis(diethylamino)benzophenone, phenanthrenequinone, 2-chlorothioxanthen-9-one, 4,4'-bis(dimethylamino)-benzophenone, diphenyliodonium hexafluorophosphate, (4-tert-butylphenyl)diphenylsulfonium triflate, diphenyliodonium nitrate, diphenyliodonium p-toluenesulfonate, (4-fluorophenyl)diphenylsulfonium triflate, triphenylsulfonium triflate, and bis(4-tert-butylphenyl)iodonium trifluoromethanesulfonate (DtBPIT).

14. The resin formulation of claim 1, wherein the luminescent dye comprises an organic dye, an inorganic luminescence material, or a combination thereof or wherein the organic dye is selected from the group consisting of diaminostilbenesulfonic acid, distilbene, benzidine, benzidinesulfonic acid, diaminofluorene, imidazolone, triazole, p-quaterphenyl, p-terphenyl, 2,5-diphenyloxazole, 2-(1-naphthyl)-5-phenyloxazole, 2-phenyl-5-(4-biphenyl)-1,3,4-oxadiazole, 3-phenyl-7-(1,2-2H-naphthotriazolyl)-coumarin, 3,7-bis(diethylamino)-phenoxazonium nitrate, 3,7-bis(diethylamino)phenoxazonium nitrate, europium-thenoyltrifluoroacetone chelate, basic yellow, rhodamine B, 6-bromoacetyl-2-dimethylaminonaphthalene; 5-carboxyfluorescein; 5 or 6-carboxyfluorescein; 6-carboxyfluorescein; fluorescein-6-isothiocyanate; 6-carboxy-2',4,4',5',7,7'-hexachlorofluorescein, 6-carboxy-2',4,7,7'-tetrachlorofluorescein, and tetramethylrhodamine-5-(and-6)-isothiocyanate, or wherein the inorganic luminescence material is selected from the group consisting of $BaTiO_3/Yb$, $La_2O_3/Yb$, $La_2O_3/Er$, $Lu_2O_3/Yb$, $Lu_2O_3/Er$, $Y_2O_3/Yb$, $Y_2O_3/Er$, $SrS/Ce$, $Lu_3Al_5O_{12}$, $Y_3Al_5O_{12}/Ce$, $SrB_4O_7/Eu$, $Sr_2P_2O_7/Eu$, $BaMgAl_{10}O_{17}/Eu$, $SrAl_2O_4/Eu$, $CaGa_2S_4$, $Sr_2Si_5N_8/Eu$, $CaWO_4$, $MgWO_4$, luminescent quantum dot consisting of CdSe, CdTe, CdS, PbSe, InP/ZnS; ZnSe/ZnS; CdSe/ZnS; CdSe/ZnS; CdTs/ZnS; CdSe/ZnO and luminescent dyes doped silica or titania nanoparticles.

15. The resin formulation of claim 1, wherein the photoabsorber is a photostabilizer selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), (2,2-dimethyl-1,3-dihydroperimidin-6-yl)-

(4-phenylazo-1-naphthyl)diazene (sudan black B), 1-(2-methoxyphenylazo)-2-naphthol (sudan red G), 2,5-bis(5-tert-butyl-benzoxazol-2-yl)thiophene, 4-methoxyphenol, and butylatedhydroxytoluene.

16. The resin formulation of claim 2, comprising about 60% to about 95% by weight of the base acrylate monomer, about 4% to about 15% by weight of the crosslinking additive, about 0.5% to about 2% by weight of the at least one photoinitiator, and about 0.01% to about 0.5% by weight of the at least one luminescent dye, wherein the sum of the weight percentage of the components in the resin formulation is 100%.

17. The resin formulation of claim 2, comprising about 50% to about 99.8% by weight of the base epoxy monomer and the solubilizing epoxy monomer, about 0.1% to about 5% by weight of the at least one photoinitiator, and about 0.1% to about 5% by weight of the at least one luminescent dye, wherein the sum of the weight percentage of the components in the resin formulation is 100%.

18. A method of preparing a resin formulation of claim 1, comprising the step of stirring a resin precursor, a crosslinking additive, a photoinitiator, and at least one luminescent dye in the absence of light for a period of time to form a reaction mixture; and optionally ultrasonicating the reaction mixture.

19. A method of printing a luminescent object comprising exposing the resin formulation of claim 1 to a light source.

20. The method of claim 19, wherein the light source is selected from the group consisting of visible light, infra-red radiation, and ultraviolet radiation.

21. A resin formulation comprising components a) a resin precursor, b) a crosslinking additive, c) at least one photoinitiator, and d) at least one luminescent dye, wherein the resin precursor of a) is a base acrylate monomer, the crosslinking additive of b) comprises a functional group selected from the group consisting of hydroxyl, alkoxyl, carboxylic acid, amine, amide, alkylacrylate, acrylate, epoxy, alkyl, and heterocycloalkyl; wherein the base acrylate monomer is present at about 60% to about 95% by weight, the crosslinking additive is present at 4% to about 15% by weight, the at least one photoinitiator is present at about 0.5% to about 2% by weight, the at least one luminescent dye is present at about 0.01% to about 0.5% by weight, and wherein the sum of the weight percentage of the components in the resin formulation is 100%.

22. A resin formulation comprising components a) a resin precursor, b) a crosslinking additive, c) at least one photoinitiator, and d) at least one luminescent dye, wherein the resin precursor of a) comprises a base epoxy monomer and a solubilizing epoxy monomer, the crosslinking additive of b) comprises a functional group selected from the group consisting of hydroxyl, alkoxyl, carboxylic acid, amine, amide, alkylacrylate, acrylate, epoxy, alkyl, and heterocycloalkyl; wherein the base acrylate monomer and solubilizing epoxy monomer are present at about 50% to about 99.8% by weight, the crosslinking additive is present at about 4% to about 15% by weight, the at least one photoinitiator is present at about 0.5% to about 2% by weight, the at least one luminescent dye is present at about 0.01% to about 0.5% by weight, and wherein the sum of the weight percentage of the components in the resin formulation is 100%.

* * * * *